UNITED STATES PATENT OFFICE.

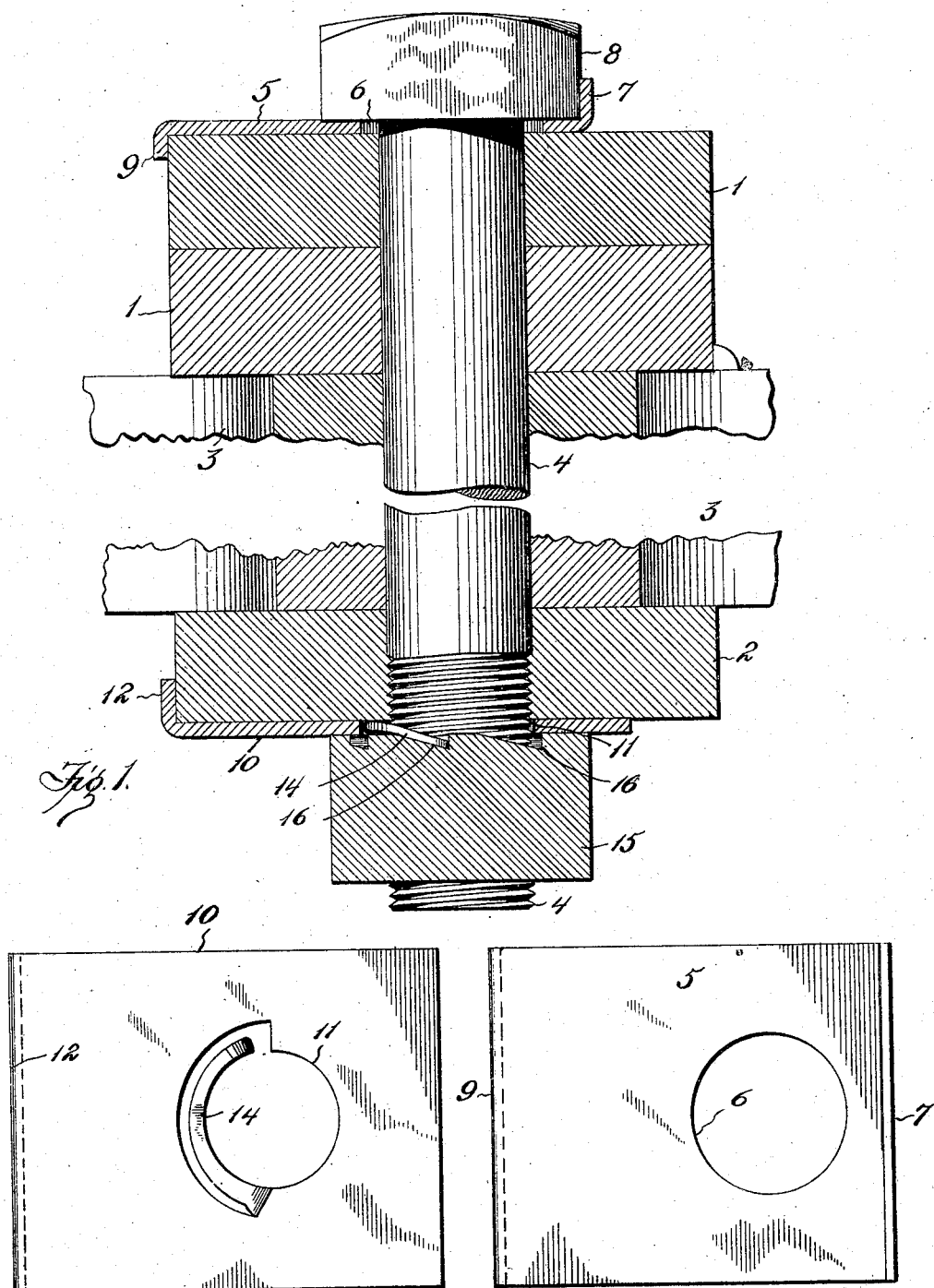

ALFRED M. GAINES, OF COLUMBUS, OHIO, ASSIGNOR TO THE CAPITOL LOCK-NUT AND WASHER COMPANY, OF COLUMBUS, OHIO, A CORPORATION OF OHIO.

COMBINED NUT AND BOLT FASTENING.

No. 858,714.  Specification of Letters Patent.  Patented July 2, 1907.

Application filed May 26, 1906. Serial No. 318,823.

*To all whom it may concern:*

Be it known that I, ALFRED M. GAINES, a citizen of the United States, residing at Columbus, in the county of Franklin and State of Ohio, have invented certain new and useful Improvements in Combined Nut and Bolt Fastenings, of which the following is a specification.

My invention relates to new and useful improvements in combined nut and bolt fasteners.

The object of the invention is to provide simple means of superior construction for fastening a bolt against movement and locking the nut thereof in position.

Another feature resides in the provision of fastenings which will be automatic in their operation, thus obviating the necessity of subsequent steps or labor after the parts have been placed in position.

Finally the object of the invention is to provide a device of the character described that will be strong, durable, efficient and simple and inexpensive to construct, and one in which the several parts will not be liable to get out of working order.

With the above and other objects in view, the invention consists of the novel details of construction and operation, a preferable embodiment of which is described in the specification and illustrated in the drawings, wherein:

Figure 1 is a transverse vertical sectional view of a portion of a car truck, showing my fasteners in section applied to one of the bolts, arch bars and stay bar thereof, Fig. 2 is a bottom view of the nut fastening plate, and Fig. 3 is a plan view of the bolt fastening plate.

In the drawings I have illustrated my invention in connection with the arch bars, stay bars and one of the box-bolts of a car truck, but it is to be understood that my fastenings may be used in various places.

The arch bars are indicated by the numeral 1, the stay bar by 2; while 3 designates portions of the bearing box. These bars are connected by a box-bolt 4 as shown in Fig. 1.

In carrying out my invention a plate 5 is arranged on the upper most arch bar 1. This plate is provided with a circular opening 6 through which the bolt 4 passes; while a flange or projection 7 turned up at the end of the plate, is engaged by the flat side of the head 8 of the bolt. At its opposite end, the plate is provided with a down turned flange or projection 9 which engages the side of the arch bar 1. The plate thus placed acts to securely hold the bolt against rotation. A similar plate 10 is placed against the underside of the stay bar 2, being provided with a circular opening 11 through which the threaded portion of the bolt 4 passes. A flange or projection 12 turned up at the end of the plate, engages the side of the stay bar and holds the plate against movement. About the circular opening 11 and extending partially therearound, a spring tongue 14 is formed. The metal about this tongue is cut-away to give it a free action; while the tongue itself is flattened and turned down toward its free end, lending thereto great resiliency and considerable play. An ordinary nut 15 having ratchet teeth 16 in its face is screwed on the bolt 4, the tongue 14 springing over and engaging in the teeth, thereby locking the nut in place. This manner of securing or fastening the nut is substantially the same as that embodied in my patent issued February 14th, 1905 and numbered 782,808.

It is to be noted that after the plates or combined fastenings 5 and 10 are placed in position and the nut 15 screwed "home," no bending of parts or other operations are necessary, the parts being entirely automatic in their operation.

It is also to be noted that the fastenings are dependent upon each other, as the bolt must be held against rotation otherwise the nut fastening would be useless.

What I claim is:

In a combined nut and bolt fastening, the combination with bars and a bolt passing through the same, of a plate receiving the bolt and having a projection engaging the head thereof, a flange formed on said plate engaging one of the bars, a second plate through which the bolt passes having a flange adapted to engage over the other bar, a spring tongue projecting from said last named plate, and a nut fitting on the bolt and having its face arranged to receive said tongue.

In testimony whereof I affix my signature in presence of two witnesses.

ALFRED M. GAINES.

Witnesses:
L. R. AYERS,
C. E. WESTERVELT.